US008073871B2

(12) United States Patent
Gutta et al.

(10) Patent No.: US 8,073,871 B2
(45) Date of Patent: Dec. 6, 2011

(54) NEAREST NEIGHBOR RECOMMENDATION METHOD AND SYSTEM

(75) Inventors: Srinivas V. R. Gutta, Buchanan, NY (US); J. David Schaffer, Wappingers, NY (US); Kaushal Kurapati, Yorktown Heights, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 1155 days.

(21) Appl. No.: 09/875,594

(22) Filed: Jun. 6, 2001

(65) Prior Publication Data

US 2003/0014404 A1    Jan. 16, 2003

(51) Int. Cl.
*G06F 17/30* (2006.01)
(52) U.S. Cl. ......... 707/791; 707/802; 707/822; 707/828
(58) Field of Classification Search ................ 707/1–10, 707/100–104.1, 200–205, 600–831; 725/39
See application file for complete search history.

(56) References Cited

U.S. PATENT DOCUMENTS

| | | | | |
|---|---|---|---|---|
| 5,758,259 A | * | 5/1998 | Lawler | 725/45 |
| 5,884,309 A | * | 3/1999 | Vanechanos, Jr. | 707/10 |
| 5,977,962 A | * | 11/1999 | Chapman et al. | 725/39 |
| 5,983,220 A | | 11/1999 | Schmitt | |
| 6,029,195 A | | 2/2000 | Herz | 709/219 |
| 6,256,628 B1 | * | 7/2001 | Dobson et al. | 707/6 |
| 6,614,987 B1 | * | 9/2003 | Ismail et al. | 725/46 |
| 6,654,739 B1 | * | 11/2003 | Apte et al. | 707/5 |
| 6,728,966 B1 | * | 4/2004 | Arsenault et al. | 725/39 |
| 2002/0056095 A1 | * | 5/2002 | Uehara et al. | 725/38 |

FOREIGN PATENT DOCUMENTS

WO    WO9837696    8/1998

* cited by examiner

*Primary Examiner* — Isaac M Woo (57) ABSTRACT

A program recommendation system employing a program record module and one of various nearest neighbor modules is disclosed. In response to a reception of a program record, the program record module converts each key field of the program record into a feature value. A single neighbor module selectively generates a recommendation of a program corresponding to the program record based upon a stored program record qualifying as a nearest neighbor of the received program record. A multiple neighbor module selectively generates a recommendation of the program corresponding to the program record based upon N number of stored program records qualifying as N number of nearest neighbors of the received program record. A neighbor cluster selectively generates a recommendation of the program corresponding to the program record based upon the cluster of stored program records qualifying as the nearest neighbor of the received program record.

6 Claims, 4 Drawing Sheets

NEAREST NEIGHBOR RECOMMENDATION METHOD AND SYSTEM

BACKGROUND OF THE INVENTION

1. Field of the Invention

The present invention relates to systems that employ an electronic program guide to assist a media user in managing a large number of media-content choices (e.g., television programming, chatrooms, on-demand video media files, audio, etc.). The present invention more specifically relates to systems having the "intelligence" to suggest choices to a user and to take actions based on the suggestions (e.g., record a program on behalf of the user).

2. Description of the Related Art

As the number of channels available to television viewers has increased, along with the diversity of the programming content available on such channels, it has become increasingly challenging for television viewers to identify television programs of interest. Historically, television viewers identified television programs of interest by analyzing printed television program guides. Typically, such printed television program guides contained grids listing the available television programs by time and date, channel and title. As the number of television programs has increased, the ability to effectively identify desirable television programs using such printed guides has become impractical.

More recently, television program guides have become available in an electronic format, often referred to as electronic program guides (EPGs). Like printed television program guides, EPGs contain grids listing the available television programs by time, date, channel and title. An EPG, however, allows television viewers to sort or search the available television programs in accordance with personalized preferences. In addition, EPGs allow for on-screen presentation of the available television programs.

While EPGs allow viewers to identify several desirable programs more efficiently than conventional printed guides, they suffer from a number of limitations, which if overcome, could further enhance the ability of viewers to identify desirable programs. For example, many viewers have a particular preference towards, or bias against, certain categories of programming, such as action-based programs, or sports programming. Thus, the viewer preferences can be applied to the EPG to obtain a set of recommended programs that may be of interest to a particular viewer.

The ultimate goal in the design of a television program recommendation program is to achieve the best possible classification of programs. This objective led to a development of different classifiers modules such as a Bayesian classifier module and a decision tree classifier module. A Bayesian classifier module is parametric, and consequently, numerous assumptions have to be made about the programs. A decision tree classifier module involves intensive computations that tend to produce a large number of disjoint rules when the data is sparse. The present invention addresses these specific disadvantages of prior art classifiers modules for recommending programs.

SUMMARY OF THE INVENTION

The present invention relates to a nearest neighbor recommendation method and system that overcomes the disadvantages associated with the prior art. Various aspects of the invention are novel, non-obvious, and provide various advantages. While the actual nature of the present invention covered herein can only be determined with reference to the claims appended hereto, certain features, which are characteristic of the embodiments disclosed herein, are described briefly as follows.

One form of the present invention is a method for generating a recommendation of a program. First, a program record corresponding to a program is received. Second, a plurality of program records is retrieved from a database. Third, one of the retrieved programs records is determined as the nearest neighbor of the received program record. And, finally, a recommendation of the program is based on the retrieved program record qualifying as the nearest neighbor.

A second form of the present invention is a computer system comprising a database and a module. The database stores a plurality of program records. The module is operable to determine one of the stored program records as a nearest neighbor of a program record received by the system. The module is further operable to generate a recommendation of the received program record based on the stored program record qualifying as the nearest neighbor.

The foregoing forms and other forms, features and advantages of the present invention will become further apparent from the following detailed description of the presently preferred embodiments, read in conjunction with the accompanying drawings. The detailed description and drawings are merely illustrative of the present invention rather than limiting, the scope of the present invention being defined by the appended claims and equivalents thereof.

DETAILED DESCRIPTION OF THE PREFERRED EMBODIMENTS

Figure 1:
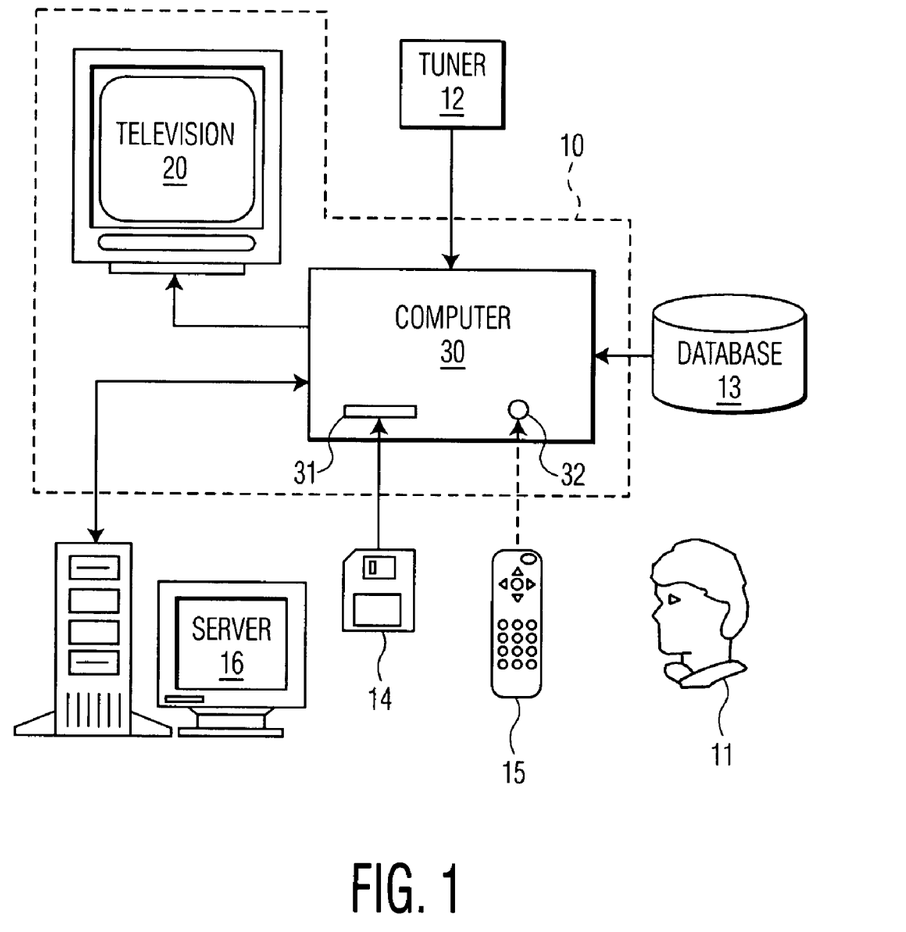
FIG. 1 is a schematic diagram of one embodiment in accordance with the present invention of an automated recommendation system.

FIG. 1 illustrates an automated program recommendation system 10 for a user 11. System 10 comprises a display device in the form of a conventional television 20 as well a computer 30. Computer 30 can be housed within television 20 or set apart from television 20 as shown.

In the illustrated embodiment, computer 30 is equipped to receive program schedule data (e.g., an electronic program guide) from a server 16. Computer 30 can optionally receive implicit profile data of other system 10 users from a server 16. Computer 30 is further equipped to receive a video signal including program schedule data from a tuner 12 (e.g., a cable tuner or a satellite tuner). Computer 30 is also equipped with an infrared port 32 to allow user 11 to select a program to be viewed via a remote control 15. For example, user 11 can utilize remote control 15 to highlight a desired selection from an electronic program guide displayed on television 20. Computer 30 can have access to a database 13 from which computer 30 can receive updated program schedule data. The access can be accomplished by a telephone line connectable to an Internet service provider or some other suitable data connection. Computer 30 is further equipped with a disk drive 31 to upload program schedule data, profile data of user 11, and profile data of other system 10 users via a removable storage media such as a disk 14.

Computer 30 may be configured in any form for accepting structured inputs, processing the inputs in accordance with prescribed rules, and outputting the processing results to thereby control the display of television 20 as would occur to those having ordinary skill in the art. Computer 30 may therefore be comprised of digital circuitry, analog circuitry, or both. Also, computer 30 may therefore be programmable, a dedicated state machine, or a hybrid combination of programmable and dedicated hardware.

Figure 2:
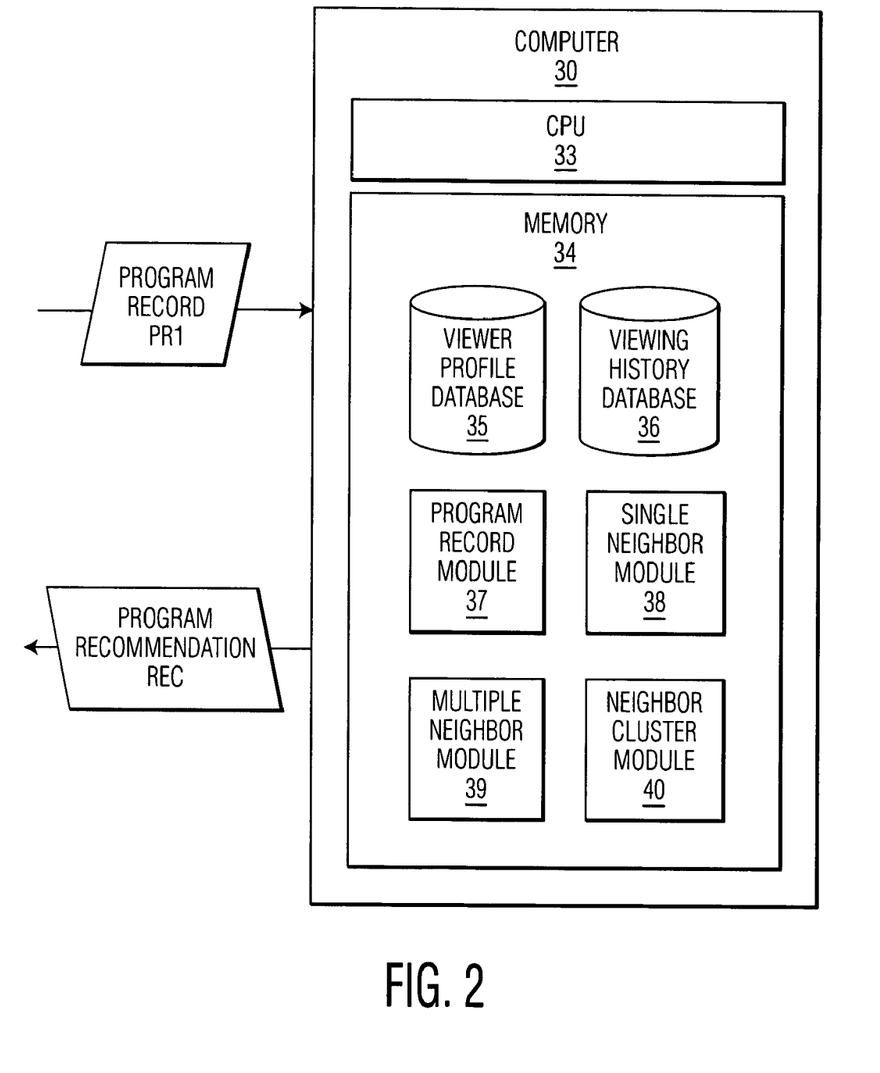
FIG. 2 is a block diagram of one embodiment in accordance with the present invention of a controller of the FIG. 1 system.

FIG. 2 illustrates one embodiment of computer 30. In the illustrated embodiment, computer 30 includes a central processing unit (CPU) 33 operatively coupled to a solid-state memory 34. CPU 33 can be from the Intel family of microprocessors, the Motorola family of microprocessors, or any other type of commercially available microprocessor. Memory 34 is a computer readable medium (e.g., a read-only memory, an erasable read-only memory, a random access memory, a compact disk, a floppy disk, a hard disk drive, and other known forms) that is electrically, magnetically, optically or chemically altered to contain computer readable code corresponding to program record module 37, a single neighbor module 38, a multiple neighbor module 39, and a neighbor cluster module 40. Additionally, memory 34 stores a viewer profile database 35 of user 11 (FIG. 1) and a viewing history database 36 of program records. To implement the computer readable code within memory 34, computer 30 can additionally include any control clocks, interfaces, signal conditioners, filters, Analog-to-Digital (A/D) converters, Digital-to-Analog (D/A) converters, communication ports, or other types of operators as would occur to those having ordinary skill in the art.

In an alternative embodiment of computer 30, program record module 37, single neighbor module 38, multiple neighbor module 39, and/or neighbor cluster module 40 can be partially or fully implemented by digital circuitry, analog circuitry, or both such as, for example, an application specific integrated circuit (ASIC). Also in alternative embodiments of computer 30, program record module 37, single neighbor module 38, multiple neighbor module 39, and/or neighbor cluster module 40 may be omitted.

Figure 3:
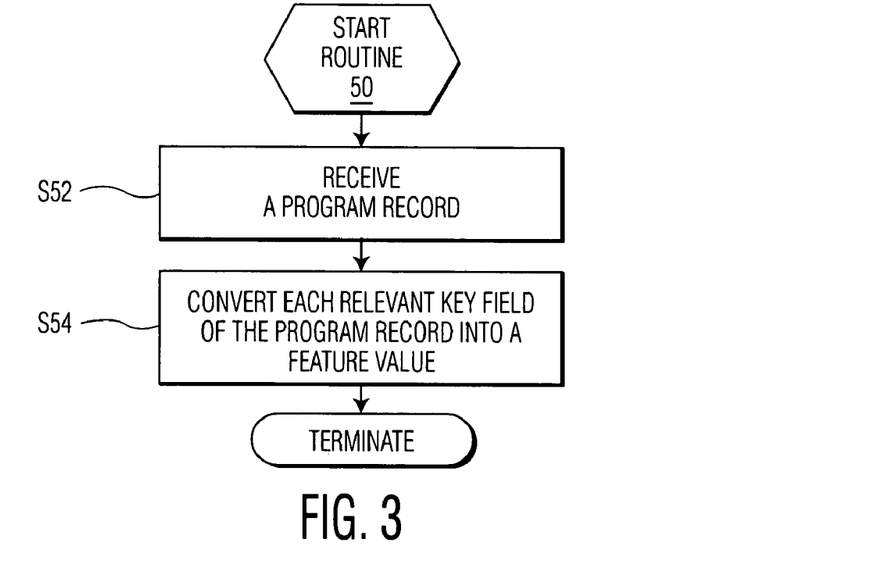
FIG. 3 is a flow chart of a program record conversion routine in accordance with present invention.

Program record module 37 implements a program record conversion routine 50 as shown in FIG. 3. During a stage S52 of routine 50, program record module 37 receives a program record PR1. The following TABLE 1 exemplary illustrates program record PR1 including key fields and corresponding descriptions:

TABLE 1

| KEY FIELD | DESCRIPTION |
| --- | --- |
| $date | yyyymmdd |
| $air_time | hhmm from 0000-2359 |
| $station_sign | 4 characters |
| $title | 120 characters |
| $desc | 120 characters |
| $genre | 20 characters |
| $actors | 120 characters |
| $directors | 120 characters |
| $hosts | 120 characters |
| $producers | 120 characters |
| $writers | 120 characters |

During a stage S54 of routine 50, program record engine 50 converts each relevant key field of program record PR1 into a feature value. The relevance of each key field is based on the incorporation of the key field within computations performed by modules 38-40 as will be further described herein. In one embodiment of stage S54, program record module 37 includes a listing of each relevant key field being divided into two or more partitions with each partition having a feature value assigned thereto. The following TABLE 2 exemplary illustrates a listing of key field partitions and corresponding feature values:

TABLE 2

| KEY FIELD: PARTITION | FEATURE VALUE |
| --- | --- |
| $air_time: Morning (6am-12pm) | 1 |
| $air_time: Afternoon (12pm-6pm) | 2 |
| $air_time: Evening (6pm-12am) | 3 |
| $air_time: Night (12am-6pm) | 4 |
| $station_sign: NBC | 1 |
| $station_sign: ABC | 2 |
| $station_sign: CBS | 3 |
| $station_sign: TBS | 4 |
| $station_sign: TNT | 5 |
| $station_sign: USA | 6 |
| $station_sign: CNN | 7 |
| $station_sign: ESPN | 8 |
| $station_sign: HBO | 9 |
| $station_sign: MTV | 10 |

Accordingly, program record module 37 converts a key field $air_time of program record PR1 to a feature value of 3 and a key field $station_sign of program record PR1 to a feature value of 9 when the aforementioned key fields indicate the program corresponding to program record PR1 is on HBO between 6 pm and 12 am. Program record module 37 terminates routine 50 upon completion of stage S54.

Figure 4:
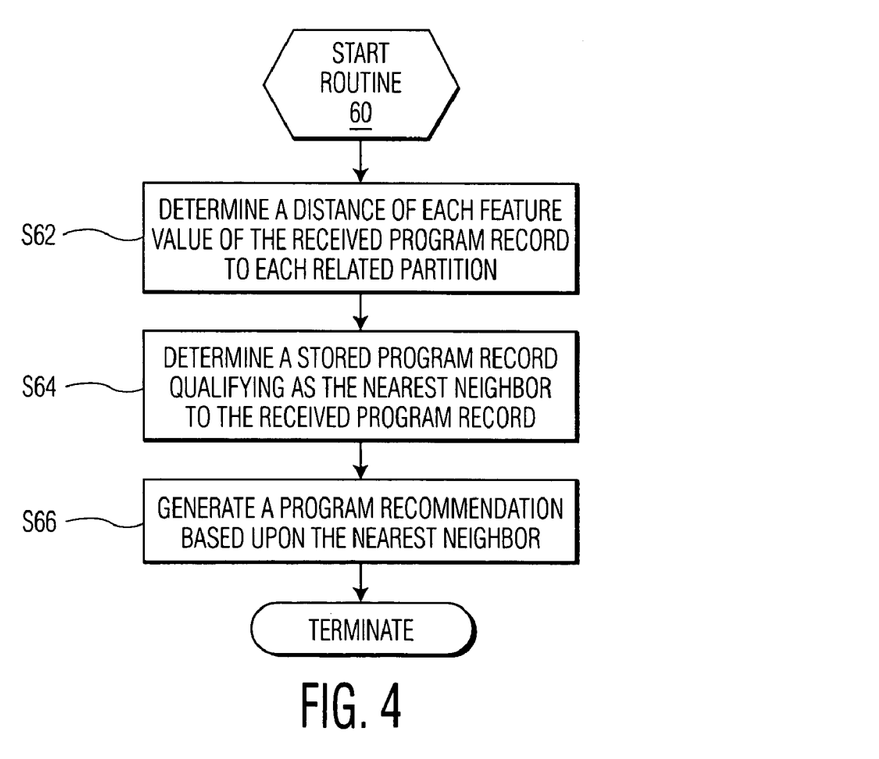
FIG. 4 is a flow chart of a single neighbor classification routine in accordance with present invention.

Single neighbor module 38 implements a single neighbor classification routine 60 as shown in FIG. 4. During a stage S62 of routine 60, single neighbor module 38 determines a distance between each feature value of program record PR1 to each related partition. In one embodiment of stage S62, single neighbor module 38 utilizes the following equation [1] during stage S62:

$$\delta(V_1, V_2) = \sum_{i=1}^{n} \left| \frac{C_{1i}}{C_1} - \frac{C_{2i}}{C_2} \right|^K \qquad [1]$$

where δ is the distance measurement, $V_1$ is the feature value of program record PR1, $V_2$ is the feature value of a related partition, n is a number of categories, $C_{1i}$ is the number of times $V_1$ was classified into category i, $C_1$ is the total number of times the feature value of program record PR1 has occurred, $C_{2i}$ is the number of times $V_2$ was classified into category i, $2_1$ is the total number of times the feature value of a related partition has occurred, and K is a constant such as, for example, 1 for Euclidean distance measurements and 2 for other types of distance measurements.

The following TABLE 3 exemplary illustrates a number of positive counts and a number of negative counts of each partition of the key field $air_time while the following TABLE 4 exemplary illustrates distance measurements based upon equation [1] with K being 1:

TABLE 3

| KEY FIELD: PARTITION | POSITIVE COUNTS | NEGATIVE COUNTS |
| --- | --- | --- |
| $air_time: Morning (6am-12pm) | 45 | 43 |
| $air_time: Afternoon (12pm-6pm) | 24 | 56 |
| $air_time: Evening (6pm-12am) | 78 | 20 |
| $air_time: Night (12am-6pm) | 27 | 45 |

TABLE 4

|  | MORNING | AFTERNOON | EVENING | NIGHT |
|---|---|---|---|---|
| EVENING | 0.56 | 0.99 | 0.00 | 0.84 |

The following TABLE 5 exemplary illustrates a number of positive counts and a number of negative counts for each partition of the key field $station_sign while the following TABLE 6 exemplary illustrates distance measurements based upon equation [1] with K being 1:

TABLE 5

| KEY FIELD: PARTITION | POSITIVE COUNTS | NEGATIVE COUNTS |
|---|---|---|
| $station_sign: NBC | 54 | 54 |
| $station_sign: ABC | 45 | 25 |
| $station_sign: CBS | 72 | 42 |
| $station_sign: TBS | 24 | 57 |
| $station_sign: TNT | 27 | 15 |
| $station_sign; USA | 67 | 34 |
| $station_sign: CNN | 45 | 42 |
| $station_sign: ESPN | 77 | 24 |
| $station_sign: HBO | 98 | 45 |
| $station_sign: MTV | 54 | 45 |

TABLE 6

|  | NBC | ABC | CBS | TBS | TNT | USA | CNN | ESPN | HBO | MTV |
|---|---|---|---|---|---|---|---|---|---|---|
| HBO | 0.37 | 0.08 | 0.10 | 0.77 | 0.08 | 0.04 | 0.33 | 0.15 | 0.00 | 0.28 |

Single neighbor module 38 thereafter proceeds to a stage S64 of routine 60 to determine which stored program within viewing history 35 is the nearest neighbor to program record PR1. In one embodiment of stage S64, a score is determined for each stored program record with the score being equal to a sum of each feature value of a stored program record. The following TABLE 7 exemplary illustrates a score for twelve (12) stored programs within viewing history database 36:

TABLE 7

| STORED PROGRAM RECORD | $air_time PARTITION | FEATURE VALUE | $station_sign PARTITION | FEATURE VALUE | SCORE |
|---|---|---|---|---|---|
| PR2 | Morning | 0.56 | NBC | 0.37 | 0.93 |
| PR3 | Morning | 0.56 | ABC | 0.08 | 0.64 |
| PR4 | Morning | 0.56 | CBS | 0.10 | 0.66 |
| PR5 | Afternoon | 0.99 | CNN | 0.33 | 1.32 |
| PR6 | Afternoon | 0.99 | TBS | 0.77 | 1.76 |
| PR7 | Afternoon | 0.99 | TNT | 0.08 | 1.07 |
| PR8 | Evening | 0.00 | NBC | 0.37 | 0.37 |
| PR9 | Evening | 0.00 | ABC | 0.08 | 0.08 |
| PR10 | Evening | 0.00 | CBS | 0.10 | 0.10 |
| PR11 | Night | 0.84 | HBO | 0.00 | 0.84 |
| PR12 | Night | 0.84 | MTV | 0.28 | 1.02 |
| PR13 | Night | 0.84 | USA | 0.04 | 0.88 |

From TABLE 7, program record PR9 qualifies as the nearest neighbor to program record PR1 with a score of 0.08.

Singe neighbor module 38 thereafter proceeds to a stage S66 of routine 60 to generate a program recommendation for program record PR1 based upon the nearest neighbor determined during stage S64. In one embodiment of stage S66, nearest neighbor module 38 compares the total positive count of the nearest neighbor to the total negative count of the nearest neighbor whereby program record PR1 is recommended if the total positive count is equal to or greater than the total negative count and whereby program record PR1 is not recommended if the total positive count is less than the total negative count.

The following TABLE 8 exemplary illustrates a comparison of the total positive count and the total negative count for program record PR9:

TABLE 8

| KEY FIELD: PARTITION | POSITIVE COUNTS | NEGATIVE COUNTS |  |
|---|---|---|---|
| $air_time: Evening | 78 | 20 |  |
| $station_sign: ABC | 45 | 25 |  |
|  | 123 | 45 | TOTALS |

The total positive count of program record PR9 is greater than the total negative counts of program record PR9. Single neighbor module 38 therefore provides a program recommendation REC via television 20 (FIG. 1) to user 11 (FIG. 1) corresponding to program record PR1.

Single neighbor module 38 terminates routine 60 upon completion of stage S66. Those having ordinary skill in the art will appreciate a benefit of routine 60 is the simplicity in the calculations performed during routine 60 and the elimination of any assumptions.

Figure 5:
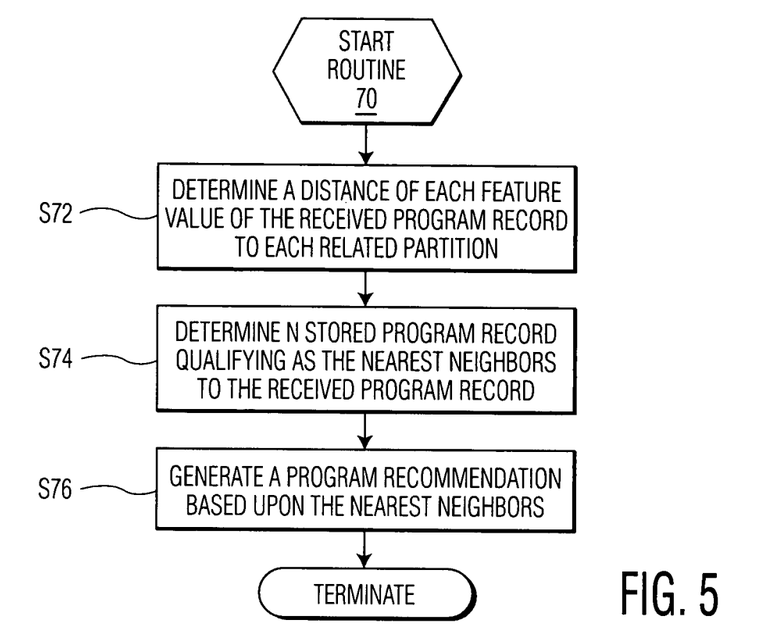
FIG. 5 is a flow chart of a multiple neighbor classification routine in accordance with present invention.

Multiple neighbor module 39 implements a multiple neighbor classification routine 70 as shown in FIG. 5. During a stage S72 of routine 70, multiple neighbor module 39 determines a distance between each feature value of program record PR1 to each related partition identically to the execution of stage S62 of routine 60 (FIG. 4) by single neighbor module 38 as previously described herein. During a stage S74 of routine 70, multiple neighbor module 39 determines N number of stored program records within viewing history database 36 that qualify as the N number of nearest neighbors to program record PR1. While N can be any number greater than 1, preferably, N is either 5, 7, or 9. In one embodiment of stage S74, multiple neighbor module 39 determines a score for each stored program record identically to the execution of stage S64 of routine 60 by single neighbor module 38. Multiple neighbor module 39 thereafter determines N number of nearest neighbors such as, for example, program records PR3, PR4, PR8, PR9 and PR10 from TABLE 7 when N is five (5).

During a stage S76 of routine 70, multiple neighbor module 39 generates a program recommendation for program record PR1 based upon N nearest neighbor determined during stage S74. In one embodiment of stage S76, multiple neighbor module 39 compares the total positive counts of the N nearest neighbors to the total negative count of the N nearest neighbors whereby program record PR1 is recommended if the total positive counts is equal to or greater than the total negative counts and whereby program record PR1 is not recommended if the total positive counts is less than the total negative counts.

The following TABLE 9 exemplary illustrates a comparison of the total positive counts and the total negative counts for program records PR3, PR4, PR8, PR9 and PR10:

TABLE 9

| PROGRAM RECORD | POSITIVE COUNTS | NEGATIVE COUNTS | |
|---|---|---|---|
| PR3 | 90 | 68 | |
| PR4 | 117 | 85 | |
| PR8 | 132 | 74 | |
| PR9 | 123 | 45 | |
| PR10 | 150 | 62 | |
| | 612 | 332 | TOTALS |

The total positive counts of program records PR3, PR4, PR8, PR9 and PR10 is greater than the total negative counts of program records PR3, PR4, PR8, PR9 and PR10. Multiple neighbor module 39 therefore provides program recommendation REC via television 20 (FIG. 1) to user 11 (FIG. 1) corresponding to program record PR1.

Multiple neighbor module 39 terminates routine 70 upon completion of stage S76. Those having ordinary skill in the art will appreciate a benefit of routine 70 is the simplicity in the calculations during routine 70 and the elimination of any assumptions.

Figure 6:
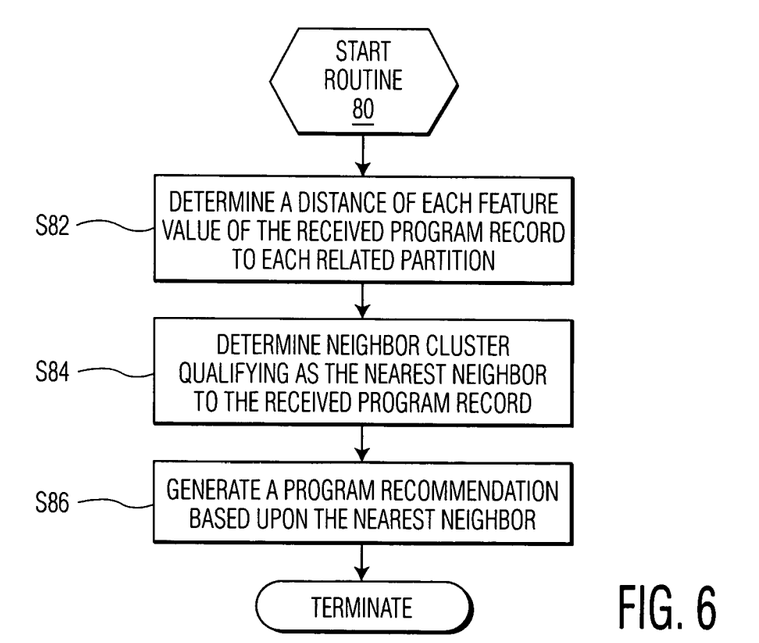
FIG. 6 is a flow chart of a neighbor cluster classification routine in accordance with present invention.

Neighbor cluster module 40 implements a multiple neighbor classification routine 80 as shown in FIG. 6. During a stage S82 of routine 80, neighbor cluster module 40 determines a distance between each feature value of program record PR1 to each related partition identically to the execution of stage S62 of routine 60 (FIG. 4) by single neighbor module 38 as previously described herein.

During a stage S84 of routine 80, module 40 determines the nearest neighbor cluster to program record PR1. In one embodiment of stage S84, neighbor cluster module 40 determines a score for each stored program record identically to the execution of stage S64 of routine 60 by module 38 as previously described herein. Neighbor cluster module 40 thereafter determines the nearest neighbor cluster based on the scores. In one embodiment of stage S84, the stored program records are formed in a watched cluster and a non-watched cluster with each cluster having an average score. The following TABLE 10 exemplary illustrates a watched cluster of the twelve (12) stored programs within viewing history database 36:

TABLE 10

| STORED PROGRAM RECORD | $air_time PARTITION | FEATURE VALUE | $station_sign PARTITION | FEATURE VALUE | SCORE |
|---|---|---|---|---|---|
| PR3 | Morning | 0.56 | ABC | 0.08 | 0.64 |
| PR9 | Evening | 0.00 | ABC | 0.08 | 0.08 |
| PR10 | Evening | 0.00 | CBS | 0.10 | 0.10 |
| PR11 | Night | 0.84 | HBO | 0.00 | 0.84 |
| PR13 | Night | 0.84 | USA | 0.04 | 0.88 |

An average score of the watched cluster is 0.50. The following TABLE 11 exemplary illustrates a non-watched cluster of the twelve (12) stored programs within viewing history database 36:

TABLE 11

| STORED PROGRAM RECORD | $air_time PARTITION | FEATURE VALUE | $station_sign PARTITION | FEATURE VALUE | SCORE |
|---|---|---|---|---|---|
| PR2 | Morning | 0.56 | NBC | 0.37 | 0.93 |
| PR4 | Morning | 0.56 | CBS | 0.10 | 0.66 |
| PR5 | Afternoon | 0.99 | CNN | 0.33 | 1.32 |
| PR6 | Afternoon | 0.99 | TBS | 0.77 | 1.76 |
| PR7 | Afternoon | 0.99 | TNT | 0.08 | 1.07 |
| PR8 | Evening | 0.00 | NBC | 0.37 | 0.37 |
| PR12 | Night | 0.84 | MTV | 0.28 | 1.02 |

An average score of the non-watched cluster is 1.01.

In another embodiment of stage S84, the stored program records are formed into clusters based on the key field $genre, such as, for example, a movie cluster, a news cluster, a sports cluster, a sitcom cluster, a music video cluster, etc. The following TABLE 12 exemplary illustrates a news cluster of the twelve (12) stored programs within viewing history database 36:

TABLE 12

| STORED PROGRAM RECORD | $air_time PARTITION | FEATURE VALUE | $station_sign PARTITION | FEATURE VALUE | SCORE |
|---|---|---|---|---|---|
| PR2 | Morning | 0.56 | NBC | 0.37 | 0.93 |
| PR3 | Morning | 0.56 | ABC | 0.08 | 0.64 |
| PR4 | Morning | 0.56 | CBS | 0.10 | 0.66 |
| PR5 | Afternoon | 0.99 | CNN | 0.33 | 1.32 |

An average score of the news cluster is 0.88. The following TABLE 13 exemplary illustrates a movie cluster of the twelve (12) stored programs within viewing history database 36:

TABLE 13

| STORED PROGRAM RECORD | $air_time PARTITION | FEATURE VALUE | $station_sign PARTITION | FEATURE VALUE | SCORE |
|---|---|---|---|---|---|
| PR6 | Afternoon | 0.99 | TBS | 0.77 | 1.76 |
| PR7 | Afternoon | 0.99 | TNT | 0.08 | 1.07 |
| PR11 | Night | 0.84 | HBO | 0.00 | 0.84 |
| PR13 | Night | 0.84 | USA | 0.04 | 0.88 |

An average score of the movie cluster is 1.13. The following TABLE 14 exemplary illustrates a music video cluster of the twelve (12) stored programs within viewing history database 36:

TABLE 14

| STORED PROGRAM RECORD | $air_time PARTITION | FEATURE VALUE | $station_sign PARTITION | FEATURE VALUE | SCORE |
|---|---|---|---|---|---|
| PR12 | Night | 0.84 | MTV | 0.28 | 1.02 |

An average score of the music video cluster is 1.02.

Neighbor cluster module 40 thereafter proceeds to a stage S86 of routine 80 to generate a program recommendation for program record PR1 based upon the nearest neighbor cluster determined during stage S84. In one embodiment of stage S86, neighbor cluster module 40 provides program recommendation REC via television 20 (FIG. 1) to user 11 (FIG. 1) corresponding to program record PR1 when the watched cluster is determined to be the nearest neighbor during stage S84. Conversely, neighbor cluster module 40 does not program recommendation REC via television 20 (FIG. 1) to user 11 (FIG. 1) corresponding to program record PR1 when the non-watched cluster is determined to be the nearest neighbor during stage S84

In another embodiment of stage S86, neighbor cluster module 40 compares the total positive counts of the nearest neighbor cluster to the total negative counts of the nearest neighbor cluster whereby program record PR1 is recommended if the total positive counts is equal to or greater than the total negative counts and whereby program record PR1 is not recommended if the total positive counts is less than the total negative counts. For example, the watched cluster of TABLE 10 is a nearest neighbor cluster of program record PR1. The following TABLE 15 exemplary illustrates a comparison of the total positive counts and the total negative counts for program records of the watched cluster of TABLE 10:

TABLE 15

| STORED PROGRAM RECORD | POSITIVE COUNTS | NEGATIVE COUNTS | |
|---|---|---|---|
| PR3 | 90 | 68 | |
| PR9 | 123 | 45 | |
| PR10 | 150 | 62 | |
| PR11 | 125 | 90 | |
| PR13 | 94 | 79 | |
| | 582 | 344 | TOTALS |

The total positive counts of the watched cluster is greater than the total negative counts of program records the watched cluster. Neighbor cluster module 40 therefore provides program recommendation REC via television 20 (FIG. 1) to user 11 (FIG. 1) corresponding to program record PR1.

Also by example, the news cluster of TABLE 12 is a nearest neighbor cluster of program record PR1. The following TABLE 16 exemplary illustrates a comparison of the total positive counts and the total negative counts for program records of the news cluster of TABLE 16:

TABLE 16

| STORED PROGRAM RECORD | POSITIVE COUNTS | NEGATIVE COUNTS | |
|---|---|---|---|
| PR2 | 99 | 97 | |
| PR3 | 90 | 68 | |
| PR4 | 117 | 85 | |
| PR5 | 69 | 98 | |
| | 375 | 348 | TOTALS |

The total positive counts of the news cluster is greater than the total negative counts of program records the news cluster. Neighbor cluster module 40 therefore provides program recommendation REC via television 20 (FIG. 1) to user 11 (FIG. 1) corresponding to program record PR1.

Neighbor cluster module 40 terminates routine 80 upon completion of stage S86. Those having ordinary skill in the art will appreciate a benefit of routine 80 is the simplicity in the calculations during routine 80 and the elimination of any assumptions.

It will be evident to those skilled in the art that the invention is not limited to the details of the foregoing illustrative embodiments, and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A method, operable on a computer system, for determining whether to recommend a program, said method comprising the steps of:

receiving a first program record representing a first program, wherein the first program record includes at least one key field, each key field including two or more partitions with each partition having a feature value assigned thereto;

retrieving a plurality of program records from a database;

converting each key field of the first program record into a feature value;

determining a distance of each feature value of the first program record to each partition of a corresponding key field;

identifying a second program record of the plurality of program records that qualifies as a nearest neighbor of the first program record as a function of the distance of each feature value of the first program record to each partition of a corresponding to the key field; and determining, based on the identified second program record, whether to recommend said first program.

2. The method according to claim 1, wherein the distance is calculated using the following formula:

$$\delta(V_1, V_2) = \sum_{i=1}^{n} \left| \frac{C_{1i}}{C_1} - \frac{C_{2i}}{C_2} \right|^K$$

where $\delta$ is the distance measurement, $V_1$ is the feature value of program record PR1, $V_2$ is the feature value of a related partition, n is a number of categories, $C_{1i}$ is the number of times $V_1$ was classified into category i, $C_1$ is the total number of times the feature value of program record PR1 has occurred, $C_{2i}$ is the number of times $V_2$ was classified into category i, $2_1$ is the total number of times the feature value of a related partition has occurred, and K is a constant.

3. The method of claim 1, wherein the determining whether to recommend comprises comparing a number of positive counts for said identified second program record to a number of negative counts for said identified second program record.

4. The method of claim 1, wherein the determining whether to recommend makes a determination, said method further comprising generating a recommendation of said first program if said determination is to recommend.

5. The method of claim 1, wherein the determining whether to recommend makes a determination, said method further comprising recommending said first program if said determination is to recommend.

6. A system, for determining whether to recommend a program, said computer comprising:

a memory for storing a database, the data base storing a plurality of program records; and a processor to receive a first program record corresponding to a first program, the first program record including at least one key field, each key field including two or more partitions, with each partition having a feature value assigned thereto, convert each key field of the first program record into a feature value, determine a distance of each feature value of the first program record to each partition of a corresponding key field, determine at least one second program record of the plurality of program records that qualifies as a nearest neighbor of the first program record as a function of the distance of each feature value of the first program record to each partition of a corresponding key field, and generate a recommendation of the first program based on the second program record.

\* \* \* \* \*